US006235658B1

(12) United States Patent
Panzer et al.

(10) Patent No.: US 6,235,658 B1
(45) Date of Patent: May 22, 2001

(54) COMPOSITE WITH A TEXTILE CHARACTER

(75) Inventors: Ulf Panzer, Perg; Christian Paulik, Linz; Anton Wolfsberger, Engerwitzdorf; Manfred Kirchberger, Prambachkirchen, all of (AT)

(73) Assignee: Borealis GmbH, Schwechat-Mannswoerth (AT)

( * ) Notice: Subject to any disclaimer, the term of this patent is extended or adjusted under 35 U.S.C. 154(b) by 0 days.

(21) Appl. No.: 09/275,685

(22) Filed: Mar. 24, 1999

(30) Foreign Application Priority Data

Apr. 3, 1998 (DE) .............................. 198 15 045

(51) Int. Cl.⁷ ..................................... B32B 27/04
(52) U.S. Cl. .............................. 442/62; 442/76; 442/286; 442/290; 442/394; 442/398
(58) Field of Search ................ 442/62, 76, 286, 442/290, 394, 398

(56) References Cited

U.S. PATENT DOCUMENTS 4,221,692 * 9/1980 Lambertini et al. ............... 260/37 N
4,714,716 * 12/1987 Park ........................................ 521/80
4,828,556 * 5/1989 Braun et al. .......................... 604/365

FOREIGN PATENT DOCUMENTS 95-11803-A1 * 5/1995 (FR) .............................. B32B/31/30

* cited by examiner

Primary Examiner—Terrel Morris
Assistant Examiner—Norca L. Torres
(74) Attorney, Agent, or Firm—Jordan and Hamburg LLP

(57) ABSTRACT

Composites with a textile character with a high water vapor permeability and a high waterproofness, consisting of textile fabrics, film coatings and/or extrusion coatings of modified polypropylenes and unmodified polypropylenes and optionally of an intermediate layer of bonding agent between the textile fabric and the film coating and/or extrusion coating.

The composites with a textile character are produced by extrusion coating or film coating of the textile fabrics.

Areas of use for the composite with a textile character are the hygiene sector, the medical sector, the textile and clothing industry, the automobile industry and construction.

9 Claims, No Drawings

COMPOSITE WITH A TEXTILE CHARACTER

The invention relates to composites with a textile character, which have a high water vapor permeability and a high waterproofness and consist of textile fabrics, a film coating and/or an extrusion coating of polyolefins and optionally a layer of bonding agent between the textile fabric and the film coating and/or extrusion coating. The composites are suitable for use in the hygiene sector, in the medical area, in the textile and clothing industry, in the automobile industry, as well as in construction.

The manufacture of textile fabrics in the form of synthetic nonwovens according to the staple fiber technology, the spin bonding technology and the melt blow technology (Fourne, F., Chemiefasern/Textilindustrie 81 (1979), 445–449; 95 (1993), 811–822, German patents 195 21 466 and 19 620 379) as well as the afterstretching of synthetic nonwovens (German patents 195 01 123 and 195 01 125), are well known.

Equally well-known is the application of extrusion coatings of polyolefins, such as polypropylene (WO 96/09 165; French patent 22 30 830), polyethylene (German patent 40 16 348, U.S. Pat. No. 4,221,692) or ethylene copolymers (French patent 27 15 948) on textile fabrics of woven, knitted and nonwoven fabrics of polyethylene, polypropylene, polyamide, polyethylene terephthalate, cotton or cellulose.

The coating of textile fabrics with polypropylene has the disadvantage that constrictions, transversely to the pull-off direction, occur already at average coating speeds and express themselves in a fluctuating width and thickness of the coating. It is known that this problem during the coating of textile fabrics can be solved by using mixtures of polypropylene and polyethylene (European patent 0 283 201, Japanese patent 03185185) or ethylene copolymers (U.S. Pat. No. 4,255,323).

Furthermore, it is known that film coatings of polypropylene can be applied on textile fabrics by thermal bonding (WO 95/11803; German patents 19 534 704 and 19 534 702) or by welding using ultrasound (European patent 0 505 027).

Polypropylenes, to which acid or acid anhydride groups are grafted, ethylene (meth)acrylate copolymers, EVA copolymers, polyisocyanates or polyurethanes are known bonding agents for intermediate layers of bonding agents to improve the adhesion of polypropylene coating to the textile fabric (Japanese patents 52094383 and 60250938).

Solutions are known for the problem of producing textile fabrics with a high water vapor permeability and a high waterproofness.

Thermally bonded nonwovens of spun bonded and nonwoven materials, which have been produced by the melt blowing method (European patent 0 814 190), or multicomponent composites of textile fabrics, permeable to water vapor, and adhesive layers, which do not permit water to permeate but are permeable to water vapor (German patent 39 22 028), are described for use as sheets stretched under roofs or as sanitary napkins.

Composites of high waterproofness, which are permeable to water vapor, are also obtained by thermally bonding fiber layers with films having rubberlike elasticity (German patent 42 43 012).

Likewise, fabrics with good breathing properties are known, which consist of an impermeable middle layer of polyvinyl alcohol film and two porous nonwovens of polypropylene as outer layers (U.S. Pat. No. 4,828,556), or of a water vapor-permeable middle layer of thermoplastic polyurethane and outer layers of thermoplastic nonwovens and micro-porous polymer membranes (WO 91/12132), or of a porous polypropylene middle layer and outer layers of spun bonded polypropylene (European patent 0 505 027).

For diapers and sanitary napkins, two-component composites are described, which consist of fine fiber nonwovens and conventional fiber nonwovens (German patent 41 08 037 and 39 17 791) or of absorbents of polypropylene woven fabrics, polypropylene nonwovens and viscose staple fibers, which are coated with polyolefins (German patent 35 15 580).

It is furthermore known that fabrics, which are highly permeable to water vapor and very inpermeable to water, can be produced by producing β-nucleated polypropylene films with addition of β-nucleating agents, such as quinacridone or metal salts of dicarboxylic acids, extracting the β-nucleated polypropylene portion from the film and, optionally, stretching the film (European patent 0 418 369; U.S. Pat. No. 5,208,098, German patent 36 10 644).

Finally, the manufacture of fabrics, which are highly permeable to water vapor and very impermeable to water, by stretching polyolefin films of polyethylene or polypropylene, which contain a high proportion of fillers, is known (European patents 0 352 802 and 0 779 325).

The disadvantages of the known solutions for producing composites with a textile character with a high water vapor permeability and high waterproofness consist therein that either the textile properties of the composites are unsatisfactory, the manufacture of the composites is problematic or technologically expensive, or the composites are not sufficiently waterproof.

It was an object of the present invention to develop composites with a textile character, which are highly permeable to water vapor and very waterproof and consist of fabrics, which are based on polypropylene and optionally an intermediate layer of adhesive.

The inventive object was accomplished by composites with a textile character, which have a water vapor permeability of more than 1,000 g/m$^2$/24 h and preferably of more than 1,800 g/m$^2$/24 h, and a waterproofness of more than 500 mm of water column mm and preferably of more than 750 of water column and consist of A) textile fabrics, B) film coatings and/or extrusion coatings and optionally C) of an intermediate layer of bonding agent between the textile fabric and the film coating and/or the extrusion coating, A) the textile fabrics representing woven, knitted or nonwoven fabrics based on polyethylene, polypropylenes, polyethylene terephthalate, polyamide, cellulose or cotton, B) the film coatings and/or extrusion coatings having a thickness of 3 to 200 μm and preferably of 5 to 70 μm and consisting of polypropylenes with the addition of 0.01 to 2.5% by weight of stabilizers, 0.01 to 1% by weight of processing aids, in each case based on the sum of the polypropylenes, and optionally 0.1 to 1% by weight of antistats, 0.2 to 3% by weight of pigments, 2 to 20% by weight of flame retardants and/or 0.05 to 1% by weight of nucleating agents, in each case based on the sum of the polypropylenes, as auxiliary materials, and/or 10 to 70% by weight and preferably 20 to 50% by weight, based on the sum of the polypropylenes, of inorganic and/or organic fillers and/or reinforcing materials, and C) the intermediate layer of bonding agent between the textile fabric and the film coating and/or extrusion coating having a thickness of 0.5 to 20 μm and preferably of 1 to 10 μm and consisting of polar olefin copolymers and/or olefin grafted copolymers, such as EVA copolymers, ethylene/acrylic acid copolymers, ethylene/methyl acrylate copolymers or polyethylene or polypropylenes grafted with unsaturated carboxylic acids or carboxylic acid anhydrides, pursuant to the invention, the polypropylenes of the film coatings and/or extrusion coatings B) either being polypropylene mixtures, which consist on the one hand of B1) 1 to 50% by weight and preferably 5 to 30% by weight of modified propylene polymers with melt indexes of 0.1 to 50 g/10 min at 230° C./2.16 kg and preferably of 1 to 40 g/10 min at 230° C./2.16 kg and a ratio of the intrinsic viscosity of the modified polypropylene to the intrinsic viscosity of the unmodified polypropylenes with largely the same weight average molecular weight of 0.20 to 0.95, and, on the other, of B2) 50 to 99% by weight and preferably of 70 to 95% by weight of b2.1) propylene polymers, preferably propylene homopolymers, prepared using Ziegler-Natta catalysts or metallocene catalysts, and/or copolymers of propylene, ethylene and/or α-olefins with 4 to 18 carbon atoms with a propylene content of 80.0 to 99.9% by weight in the form of random copolymers, block copolymers and/or random block copolymers with melt indexes of 0.1 to 300 g/10 min at 230° C./2.16 kg and preferably of 1 to 150 g/10 min at 230° C./2.16 kg, and/or b2.2) a polyolefin mixture with an $M_{w/M_n}$ ratio of 2 to 6 and a melt index of 1 to 40 g/10 min at 230° C./2.16 kg, which consists of b2.2.1) 60 to 98% by weight of a crystalline copolymer of 85 to 99.5% by weight of propylene and 15 to 0.5% by weight of ethylene and/or an α-olefin of the general formula $CH_2=CHR$, R being a linear or branched alkyl group with 2 to 8 carbon atoms, and b2.2.2) 2 to 40% by weight of an elastic copolymer of 20 to 70% by weight of ethylene and 80 to 30% by weight of propylene and/or an α-olefin of the general formula $CH_2=CHR$, R being a linear or branched alkyl group with 2 to 8 carbon atoms, and/or b2.3) largely amorphous polypropylenes or propylene copolymers with a proportion of crystalline polypropylene or crystalline propylene copolymer of less than 10% by weight, an enthalpy of melting of less than 40 J/g and a melt index of 0.1 to 100 g/10 mm at 230° C./2.16 kg, the largely amorphous polypropylene being a homopolymer of propylene and/or a copolymer of propylene of at least 80 mole percent of propylene and at most 20 mole percent of one or more α-olefins of the general formula $CH_2=CHR$, wherein R is a linear or branched alkyl group with 2 to 8 carbon atoms, and/or b2.4) non-isotactic propylene homopolymers with a melt index of 145° to 165° C., a melt viscosity in excess of 200,000 cps at 190° C., a heat of crystallization of 4 to 10 cal/g and a portion, soluble in diethyl ether, of 35% by weight to 55% by weight, or polypropylene mixtures, which consist only of B2), the components b2.2), b2.3) and b2.4) individually being contained in amounts of 5 to 100% by weight and the remaining components, individually or as a whole in the mixture, being contained in an amount up to 95% by weight.

The modified propylene polymers B1), which optionally are contained in the film coatings and/or extrusion coatings B of the inventive composites with a textile character, preferably are modified propylene polymers, which are produced by the treatment of propylene homopolymers and/or copolymers of propylene and ethylene or α-olefins with 4 to 18 carbon atoms, as well as of mixtures of said polypropylenes with multi-functional, ethylenically unsaturated monomers and/or with ionizing radiation or thermally decomposing free radical-forming agents.

Examples of these modified propylene polymers B1), produced by the treatment of polypropylenes with multifunctional ethylenically unsaturated monomers and/or ionizing radiation or thermally decomposing, free radical-forming agents are, in particular modified polypropylenes by reacting polypropylenes with bis maleimide compounds in the melt (European patent 574 801 and 574804), modified polypropylenes by the treatment of polypropylenes with ionizing radiation in the solid phase (European patents 190889 and 634454), modified polypropylenes by the treatment of polypropylenes with peroxides in the solid phase (European patent 384431; German patent 4340194) or in the melt (European patent 142 724), modified polypropylenes by the treatment of polypropylenes with multifunctional ethylenically unsaturated monomers under the action of ionizing radiation (European patent 678527), modified polypropylenes by the treatment of polypropylenes with multifunctional ethylenically unsaturated monomers in the presence of peroxides in the melt (European patents 68817 and 450342).

A preferred variation for modified propylene polymers B1), which were produced by the treatment of propylene homopolymers and/or copolymers of propylene and ethylene or α-olefins with 4 to 18 carbon atoms as well as of mixtures of said polypropylenes with multifunctional ethylenically unsaturated monomers and thermally decomposing free radical-forming agents, are modified propylene polymers B1), produced by a continuous method, for which 1) propylene particles in the form of powders, granulates or grit with a preferred particle size ranging from 0.001 to 7 mm, which were prepared from 1.1) propylene homopolymers, especially from propylene homopolymers with a bimodal molecular weight distribution, weight average molecular weights $M_w$ of 500,000 to 1,500,000 g/mole, number average molecular weights $M_n$ of 25,000 to 100,000 g/mole and $M_w/M_n$ values of 5 to 60, which were produced in a reactor cascade using Ziegler-Natta catalysts or metallocene catalysts, and/or from 1.2) copolymers of propylene and ethylene or α-olefins with 4 to 18 carbon atoms, preferably of random propylene copolymers, propylene block copolymers, random propylene block copolymers and/or elastomeric polypropylenes, or of mixtures of said modified polypropylenes, are mixed in a continuous mixer with 0.05 to 3% by weight, based on the polypropylenes used, of acyl peroxides, alkyl peroxides, hydroperoxides, peroxycarbonates and/or peresters as thermally decomposing free radical-forming agents, the thermal decomposition of which preferably is concluded at a temperature below 210° C. and which optionally are diluted with inert solvents, while being heated to 30° to 100° C. and preferably to 70° to 90° C., 2) readily volatile bifunctional monomers, especially $C_4$ to $C_{10}$ diene and/or $C_7$ to $C_{10}$ divinyl compounds, which are adsorbed by the polypropylene particles from the gas phase, preferably in continuous flow-through mixers, as continuous gas-solid adsorbers, at a temperature T of 20° C. to 120° C. and preferably of 60° C. to 100° C., and an average absorption time $t_s$ of 10 seconds to 1,000 seconds and preferably of 60 seconds to 600 seconds, the proportion of bifunctional, unsaturated monomers in the polypropylene particles being 0.01 to 10% by weight and preferably 0.05 to 2% by weight, based on the polypropylenes used, subsequently 3) the polypropylene particles, in which the acyl peroxides, alkyl peroxides, hydroperoxides, peroxycarbonates and/or peresters, as thermally decomposing free radical-forming agents, and the bifunctional, unsaturated monomers are absorbed, under an atmosphere of inert gas and these readily volatile, bifunctional monomers are melted at 110° C. to 210° C. in continuously operating kneaders or extruders, preferably in twin-screw extruders and, at the same time, the thermally decomposing free radical-forming agents are decomposed, 4) the melt then is heated to 220° C. to 300° C., unreacted monomers and decomposition products being removed, and 5) the melt is granulated by known procedures, and for which, before step 1) and/or 5) of the method and/or before or during step 3) and/or 4) of the method, 0.01 to 2.5% by weight of stabilizers, 0.1 to 1% by weight of antistats, 0.2 to 3% by weight of pigments, 0.05 to 1% by weight of nucleating agents and/or 0.01 to 5% by weight of processing aids, based on the polypropylene used, are added as further auxiliary materials.

Preferably, as modified propylene polymers B1), which are optionally contained in the film coatings and/or extrusion coatings B of the inventive composites with a textile character, likewise modified propylene polymers are preferred, which are prepared by reacting functionalized polypropylenes, preferably polypropylenes containing acid groups and/or anhydride groups, with multifunctional compounds of opposite reactivity, preferably with $C_2$ to $C_{18}$ diamines and/or $C_2$ to $C_{16}$ diols.

Examples of modified propylene polymers, which were produced by polymer-like reactions, are, in particular:

modified polypropylenes by reacting polypropylene, grafted with maleic anhydride, with diamines or polyglycols (European patent 177401; Japanese patent 08 176 365), modified polypropylenes by reacting polypropylenes, containing acid groups or acid anhydride groups, with polymers containing epoxy, hydroxy or amino groups (European patents 307,684 and 299,486).

Furthermore, as modified propylene polymers B1), which optionally are contained in the film coatings and/or extrusion coatings B of the inventive composites with a textile character, modified propylene polymers are preferred, which were prepared by the hydrolytic condensation of polypropylenes, which contain hydrolyzable silane groups. The products, described in the German patent 4107635 or the U.S. Pat. No. 4,714,716, are examples.

The propylene polymers b2.1), optionally preferably contained in the film coatings and/or the extrusion coatings B of the inventive composites with a textile character, are propylene homopolymers and/or copolymers of propylene and ethylene or α-olefins with 4 to 18 carbon atoms as well as mixtures of said polypropylenes with melt indexes of 0.1 to 300 g/10 min at 230° C./2.16 kg and especially of 1 to 100 g/10 min at 230° C./2.16 kg. In this connection, especially suitable are propylene homopolymers with a bimodal molecular weight distribution, weight average molecular weights $M_w$ of 50,000 to 1,500,000 g/mole, number average molecular weights of 25,000 to 100,000 g/mole and $M_w/M_n$ values of 2 to 60, which were produced in reactor cascade. The copolymers of propylene and ethylene or α-olefins may be present in the form of random propylene copolymers, propylene block copolymers and/or random propylene block copolymers.

The polyolefin mixtures of crystalline copolymers and elastic copolymers, contained in the film coatings and/or extrusion coatings B of the inventive composites with a textile character optionally preferably as propylene polymers b2.2) are, for example, the polymer mixtures described in European patent 400 333 or European patent 472 946.

The largely amorphous polypropylenes or propylene copolymers, contained in the film coatings and/or extrusion coatings B of the inventive composites with a textile character optionally preferably as propylene polymers b2.3) are, in particular, stereo block polypropylenes, which are prepared, for example, using highly active Ziegler-Natta catalysts fixed on a metal oxide (Collette, J., Macromolecules 22 (1989), 3851–3858; German patent 2830160) or soluble Ziegler-Natta catalysts (de Candia, F., Makromol. Chem. 189 (1988), 815–821), optionally with subsequent reactive modification (European patent 636863) and/or degradation (European patent 640 850).

Examples of the non-isotactic propylene homopolymers, contained in the film coatings and/or extrusion coatings B of the inventive composites with a textile character optionally preferably as propylene polymers b2.4), are the products described in the European patent 475 307 or in the European patent 475 308.

Especially preferred are composites with a textile character, which contain, aside from the modified polypropylenes B1), several of the polypropylene components b2.1) to b2.4) in the film coatings and/or extrusion coatings B.

The stabilizers, contained in the film coatings and/or extrusion coatings B of the inventive composites with a textile character, preferably are mixtures of 0.01% to 0.6% by weight of phenolic antioxidants, 0.01% to 0.6% by weight of 3-arylbenzofuranones, 0.01% to 0.6% by weight of processing stabilizers based on phosphites, 0.01% to 0.6% by weight of high temperature stabilizers based on disulfides and thioethers and/or 0.01% to 0.8% by weight of sterically hindered amines (HALS).

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis (6-t-butyl-4-methylphenol), 4,4'-thio-bis-(6-t-butyl-2-methylphenol), octadecyl 3(3,5-di-t-butyl-4-hydroxyphenyl) propionate, 1,3,5-trimethyl-2,4,6-tris(3', 5'-di-t-butyl-4-hydroxybenzyl)benzene and/or pentaerythritol-tetrakis(3-(3,5-di-t-butyl-4-hydroxyphenyl)) propionate.

As benzofuranone derivative, 5,7-di-t-butyl-3-(3,4-dimethylphenyl)-3H-benzofuran-2-one, in particular, is suitable.

As HALS compounds, bis-2,2,6,6-tetramethyl-4-piperidyl sebacate and/or poly-((1,1,3,3-tetramethylbutyl)-imino)-1,3,5-triazine-2,4-diyl)(2,2,6,6-tetramethylpiperidyl)amino)hexamethylene-4-(2,2,6,6-tetramethyl)piperidyl)-imino) are particularly suitable.

The nucleating agents, optionally contained in the film coatings and/or extrusion coatings B of the inventive composites with a textile character, preferably are α-nucleating agents, such as talcum, sorbitol and sorbitol derivatives, sodium benzoate or the sodium salt of methylene-bis(2,4-di-t-butylphenol) phosphoric acid or β-nucleating agents, such as adipic acid, the dianilide of adipic acid, quinacridinonequinone, salts of dicarboxylic acids, such as calcium pimelate and/or N,N'-dicyclododecyl-4,4'-biphenyldicarboxade.

As processing aids, the film coatings and/or extrusion coatings B of the inventive composites with a textile character may contain calcium stearate, magnesium stearate and/or waxes.

Examples of inorganic fillers and/or reinforcing materials, contained in the film coatings and/or extrusion coatings B of the inventive composites with a textile character, are silica, particularly in the form of glass or quartz; silicates, particularly talcum; titanates, titanium dioxide, aluminum oxide, kaolin, magnesium oxide, magnesite, iron oxides, silicon carbide, silicon nitride, barium sulfate and/or calcium carbonates.

Examples of organic fillers and/or reinforcing agents, contained in the film coatings and/or extrusion coatings B of the inventive composites with a textile character, are mechanical wood pulp, fibers or particles of cellulose, starch, poly(methyl methacrylate), polyvinyl alcohol, polytetrafluoroethylene, polyamide, polyethylene terephthalate or duroplastic synthetic materials.

The textile fabrics A) of the inventive composites with a textile character, preferably are polypropylene nonwoven with a weight per unit area of 5 to 70 g/m$^2$, which were prepared by spin bonding or staple fiber technology. Polypropylene nonwovens, which were prepared by the spin bonding technology, are especially preferred.

Composites with a textile character, the textile fabrics A) of which consist of polypropylene nonwovens and the film coating and/or extrusion coating B of which consists of polypropylenes, have the special advantage that the intermediate layer C) of bonding agent can be omitted and that the composites can be worked up into recycled polypropylene.

As organic fillers and/or reinforcing agents in component B) of the composite with a textile character, calcium carbonates or chalks with a particle diameter, measured over the longest extent of the particles, of 0.05 to 20 μm and particularly of 0.1 to 10 μm, are preferred.

A specially preferred variation of the composites with a textile character is formed by composites, the film coatings and/or extrusion coatings B of which consist of 5 to 25% by weight of modified propylene polymers, 25 to 60% by weight of component b2.2) and 20 to 50% by weight of chalk.

The composites with a textile character with a water vapor permeability in excess of 1,000 g/m$^2$/24 h and preferably in excess of 1,800 g/m$^2$/24 h and a waterproofness in excess of 500 mm water column and preferably in excess of 750 mm water column, are prepared by a method by 1) applying a film coating with a layer thickness of 3 to 200 μm and preferably of 5 to 70 μm of composition B) by the chill roll coating method at mass temperatures of 190° to 290° C., optionally with the application of an intermediate layer C) of bonding agent on textile fabrics A), or 2) applying an extrusion coating with a layer thickness of 3 to 200 μm and preferably of 5 to 70 μm of composition B) by the extrusion coating method at mass temperatures of 200° to 290° C., optionally with the application of an intermediate layer C) of bonding agents on textile fabrics A), or 3) thermally bonding a polypropylene film having a thickness of 10 to 200 μm and preferably of 20 to 100 μm of composition B) with a textile fabric A), optionally with application of an intermediate layer C) of bonding agents on textile fabric A), A) the textile fabrics being woven, and knitted or nonwoven fabrics based on polyethylene, polypropylene, polyethylene terephthalate, polyamide, cotton or cellulose, B) the film coatings and/or extrusion coatings being of polypropylenes with addition of 0.01 to 2.5% by weight of stabilizers, 0.01 to 1% by weight of processing aids, in each case based on the sum of the polypropylenes, and optionally 0.1 to 1% by weight of antistats, 0.2 to 3% by weight of pigments, 2 to 20% by weight of flame retardants and/or 0.05 to 1% by weight of nucleating agents, in each case based on the sum of the polypropylenes, as auxiliary materials, and/or 10 to 70% by weight and preferably 20 to 50% by weight, based on the sum of the polypropylenes, of inorganic and/or organic fillers and/or reinforcing materials, and C) the intermediate layer of bonding agent between textile fabric and film coating and/or extrusion coating having a layer thickness of 0.5 to 20 μm and preferably of 1 to 10 μm and consisting of: polar olefin copolymers and/or olefin grafted copolymers, such as EVA copolymers, ethylene acrylic acid copolymers, ethylene methyl acrylate copolymers or polyethylene or polypropylene grafted with unsaturated carboxylic acids or carboxylic acid anhydrides, pursuant to the invention, the polypropylenes of the film coatings and/or extrusion coatings B) being either polypropylene mixtures, which consist, on the one hand, of B1) 1 to 50% by weight and preferably of 5 to 30% by weight of modified propylene polymers with melt indexes of 0.1 to 50 g/10 min at 230° C./2.16 kg and preferably of 1 to 40 g/10 min at 230° C./2.16 kg and a ratio of the intrinsic viscosity of the modified polypropylene to the intrinsic viscosity of the unmodified polypropylene with largely the same weight average molecular weight of 0.20 to 0.95 and, on the other, of B2) 50 to 99% by weight and preferably of 70 to 95% by weight of b2.1) propylene polymers, preferably propylene homopolymers, prepared using Ziegler-Natta catalysts or metallocene catalysts, and/or copolymers of propylene, ethylene and/or α-olefins with 4 to 18 carbon atoms with a propylene content of 80.0 to 99.9% by weight in the form of random copolymers, block copolymers and/or random block copolymers with melt indexes of 0.1 to 300 g/10 min at 230° C./2.16 kg and preferably of 1 to 150 g/10 min at 230° C./2.16 kg, and/or b2.2) a polyolefin mixture with an $M_w/M_n$ ratio of 2 to 6 and a melt index of 1 to 40 g/10 min at 230° C./2.16 kg, which consists of b2.2.1) 60 to 98% by weight of a crystalline copolymer of 85 to 99.5% by weight of propylene and 15 to 0.5% by weight of ethylene and/or an α-olefin of the general formula $CH_2$=CHR, R being a linear or branched alkyl group with 2 to 8 carbon atoms, and b2.2.2) 2 to 40% by weight of an elastic copolymer of 20 to 70% by weight of ethylene and 80 to 30% by weight of polypropylene and/or an α-olefin of the general formula $CH_2$=CHR, R being a linear or branched alkyl group with 2 to 8 carbon atoms, and/or b2.3) largely amorphous polypropylenes or propylene copolymers with a proportion of crystalline polypropylenes or crystalline propylene copolymer of less than 10% by weight, an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole percent of propylene and at most 20 mole percent of one or more α-olefins of the general formula $CH_2=CHR$, wherein R is a linear or branched alkyl group with 2 to 8 carbon atoms, and/or b2.4) non-isotactic propylene homopolymer with a melting point of 145° to 165° C., a melt viscosity in excess of 200,000 cps at 190° C., a heat of crystallization of 4 to 10 cal/g and a 35% by weight to 55% by weight portion, soluble in diethyl ether, or polypropylene mixtures, which consist only of B2), the components b2.2), b2.3) and b2.4) individually being contained in amounts of 5 to 100% by weight and the remaining components, individually or as a whole in the mixture, being contained in an amount up to 95% by weight
and that the composites with a textile character can be subjected to a monoaxial or biaxial afterstretching.

As extruder for melting the polypropylenes or polypropylene mixtures for the production of the film coatings B) of the composites with a textile character according to the chill-roll method or for producing the extrusion coatings B) of the composites with a textile character by the extrusion coating method, extruders with short compression screws or three-zone screws with L/D=22 to 33 are suitable. Preferred are 5-zone screws with a drawing-in zone, a compression zone and a homogenizing zone. Screws with cutting depths of 1:2.5 to 10:3.5 are preferably suitable. It is particularly advantageous to connect static mixers and/or melt pumps between the cylinder and the die.

Film coatings B) of the composites with a textile character with layer thicknesses of 20 to 70 μm from the propylenes or propylene mixtures can be produced by the chill-roll method. The film coatings B) are produced on conventional chill-roll equipment consisting of sheet die, suction doctor blade, air knife, cooling roller I, polishing roller, lateral fixing of the film by means of air or electrostatic contacting pressure, cooling roller p and drawing-off unit. The preferred melt temperatures, when the polypropylene melt leaves the sheet die, range from 200° to 260° C. Both cooling rollers should be set at a temperature between 10° and 80° C. and preferably between 15° and 40° C.

A further preferred variation for the production of the coatings B) of the composites with a textile character consists of the application by the extrusion coating method, for which mass temperatures ranging from 190° to 320° C. are required. The usual coating thicknesses are between 5 and 70 μm.

For the inventive method of producing the composites with a textile character, the textile fabrics A) can optionally, for the purpose of producing improved adhesion, be pretreated according to known methods, such as the application of coronary discharges or by ozone, or an intermediate layer C) of bonding agents with a layer thickness of 0.5 to 20 μm, consisting of polar olefin copolymers and/or grafted olefin copolymers, can be applied as a melt, dispersion or solution between textile fabric A) and the film coating and/or extrusion coating B).

The special advantage of the inventive composites with a textile character and with high permeability for water vapor and high waterproofness consists therein that, when the inventive polypropylene formulations are used, film coatings and/or extrusion coatings can be produced which, in comparison with conventional propylene polymers for the production of composites, are distinguished by higher production speeds, fewer equipment breakdowns and a higher dimensional accuracy of the coating (less "neck-in" and thickness inhomogeneity) and, in comparison to film coatings and/or extrusion coatings based on polyethylene on textile fabrics of polypropylene, by an improved adhesion, a higher thermal stability and by recycling capabilities.

The required permeability to water vapor of more than 1,000 g/m²/24 h and waterproofness of more than 600 mm of water column of the textile composites with a textile character is accomplished, pursuant to the invention, by the polypropylene coating formulation of the film coatings and/or extrusion coatings of the textile fabrics, the thickness of the film coatings and/or extrusion coatings and optionally by the afterstretching of the composites.

Preferred areas of use of the inventive composites with a textile character are of the hygiene sector, especially for baby diapers, incontinence products, panty inserts and sanitary napkins, in the medical sector, particularly for operating room clothing, clothing to protect against infection, table and bed covers, in the textile and clothing industry, particularly for industrial protective clothing, sports and a military clothing, interlining materials and decorative nonwoven covering materials, in the automobile industry, especially for sound-adsorbing linings, thermal insulation and filter inserts, as well as in construction, especially for geotextile sheets, thermal and sound insulation, drainage and dividing nonwovens and roof linings.

The invention is explained by means of the following examples.

EXAMPLE 1

Preparation of the Modified Propylene Polymers

A powdery polypropylene homopolymer (with a melt index of 0.2 g/10 min at 230° C./2.16 kg) and an average particle diameter of 0.55 mm) is metered continuously into a continuous, heatable mixer. Furthermore, 0.1% by weight of calcium stearate and 0.09% by weight of bis(t-butylperoxy)-2,5-dimethylhexane, in each case based on the polypropylene homopolymer, are metered continuously into the continuous mixer. While being mixed homogeneously at 45° C., the polypropylene homopolymer, charged with the thermally decomposing free radical-forming agent and auxiliary material, is charged absorptively during a residence time of 6 minutes at 45° C. by means of a mixture of butadiene and nitrogen with 0.4% by weight of butadiene, based on the polypropylene homopolymer. After being transferred to a twin-screw extruder, the powdery reaction mixture, in contact with the added mixture of butadiene and nitrogen and with the addition of 0.1% by weight of tetrakis (methylene(3,5-di-t-butylhydroxyhydrocinnamate)methane and 0.1% by weight of tris(2,4-di-t-butylphenyl)phosphite, is melted at a mass temperature of 235° C. and, after a coarse degassing, subjected to a fine degassing while water is being added as an entraining agent, discharged and granulated.

The resulting, modified polypropylene has a bound butadiene content, determined by IR spectroscopy, of 0.26% by weight, a melt index of 2.5 g/10 min at 230° C./2.16 kg and a crystallization point (DSC) of 128° C.

Preparation of the Polypropylene Mixture

A mixture of

15% by weight of a modified propylene, with a bound butadiene content of 0.26% by weight, a melt index of 2.5 g/10 min at 230° C./2.16 kg and a crystallization point (DSC) 128° C., 45% by weight of a heterophasic polypropylene mixture, with a melt index of 25 g/10 min at 230° C./2.16 kg and an $M_w/M_n$ ratio of 3.6, of a crystalline propylene ethylene copolymer and an elastic ethylene propylene copolymer, 40% by weight of a coated chalk with an average particle diameter, measured over the longest extent of the particles, of 1 µm, 0.35% by weight, based on the sum of the polypropylenes, of 5,7-di-t-butyl-(2,5-dimethylphenyl)-3H-2-benzofuranone, is melted in a Werner & Pfleiderer ZSK 84 twin screw extruder with a melt profile of 100/145/185/210/235/220/200/190° C., homogenized, discharged and granulated.

The resulting polypropylene compound has a melt index of 15 g/10 min at 230° C./2.16 kg and a density of 1.30 g/cc at 23° C.

Production of the Composite with a Textile Character

On laboratory chill-roll equipment, consisting of a plasticizing extruder with a sheet die, suction doctor blade, air knife, cooling roller I, polishing roller, cooling roller II, transporting system, cutting device and winding equipment, the compound is melted in the extruder at a temperature profile of 190/200/210/210/220/220° C. and the melt is extruded through the sheet die at a temperature of 220° C. directly onto a supplied polypropylene nonwoven with a weight per unit area of 20 g/m² at an equipment speed of 60 m/min and fixed and the composite as a whole is drawn off, edge trimmed and rolled up. Subsequently, the composite is stretched biaxially in a further step of the method.

The weight per unit area of the polypropylene coating, applied on the polypropylene nonwoven, is 30 g/m² before the stretching.

The resulting composite with good breathing properties has a water vapor permeability of 1870 g/cm²/24 h and a waterproofness of more than 850 mm of water column.

EXAMPLE 2

Preparation of the Modified Propylene Polymer

In the kneader, 0.15% by weight of 2,6-dicyclopentyl-4-methylphenol and 0.15% by weight of bis-2,2,6,6-tetramethyl-4-piperidyl sebacate are drummed onto a powdery polypropylene homopolymer, with a melt index of 5.5 g/10 min at 230° C./2.16 kg and an average particle diameter of 0.2 mm, and the mixture is conveyed pneumatically by nitrogen into a cassette reactor, 0.20×3.50 Mn, with 4 integrated cathodes of a low energy accelerator of the band beam type with an energy of 250 keV and a beam output of 4×10 KW and integrated vibration equipment, the throughput at an irradiation temperature of 95° C. being 2.2 kg/minute. The resulting, modified polypropylene mixture has a melt index of 5.5 g/10 min at 230° C./2.16 kg.

Production of the Composite with Good Breathing Properties

In a tumbling mixer,

30% by weight of a powdery, modified polypropylene mixture, with a melt index of 5.5 g/10 min at 230° C./2.16 kg, 20% by weight of a propylene copolymer, with a melt index of 8.5 g/10 min at 230° C./2.16 kg, a density of 0.905 g/cc at 23° C. and an ethylene content of 4 mole percent, 15% by weight of a reactor blend, with an ethylene content of 33 mole percent and a melt index of 8 g/10 min at 230° C./2.16 kg, consisting of a crystalline propylene ethylene copolymer and an elastic ethylene propylene copolymer, 35% by weight of a coated chalk with an average particle diameter, measured over the longest extent of the particles, of 1 µm, as well as 0.1% by weight of tetra-kis(methylene(3,5-di-t-butylhydroxyhydrocinnamate)methane and 0.1% by weight of tris-(2,4-di-t-butylphenyl)phosphite, in each case based on the sum of the polyolefins, are mixed and supplied to the feeding funnel of laboratory coating co-extrusion equipment consisting of plasticizing extruders, sheet die, transporting system, cutter and winder. In the first plasticizing extruder, with a screw diameter of 60 mm, 33 D and a temperature profile of 180/240/260/290/290° C., the coating formulation is melted. In the second plasticizing extruder, with a screw diameter of 30 mm, 25D and a temperature profile of 190/240/260/280/280° C., a bonding agent (random propylene ethylene copolymer, grafted with 0.45% by weight of maleic anhydride), is melted. The two layers are extruded at 290° C. through the sheet die with a die width of 650 mm and coated directly onto the polyethylene terephthalate woven fabric (weight per unit area of 35 g/m²), cooled on the cooling roller that has been cooled to 20° C., trimmed, drawn off and wound onto a central winder. The composite, as a whole, is stretched biaxially in a further step of the method.

The "neck-in" during the film coating is 70 mm, that is, the realistic coating width is 580 mm. The thickness distribution of the coating is of the order of 20±0.5 µm.

The resulting composite with good breathing properties has a water vapor permeability of 1450 g/cm²/24 h and a waterproofness in excess of 850 mm of water column.

EXAMPLE 3

Preparation of the Modified Propylene Polymer

A powdery random polypropylene copolymer, with a melt index of 4.25 g/10 min at 230° C./2.16 kg and an average particle diameter of 0.85 mm, is metered continuously into a continuous, heatable mixture. Furthermore, 0.05% by weight of hydrocalcite, 0.05% by weight of calcium stearate and 0.45% by weight of t-butyl peroxybenzoate, in each case based on the polypropylene copolymer, are metered continuously into the continuous mixer. While being mixed homogeneously at 70° C., the polypropylene homopolymer, charged with thermally decomposing free radical-forming agent and auxiliary material, is charged absorptively, by the mixture of divinylbenzene and nitrogen flowing in, with 0.35% by weight of divinylbenzene, based on the polypropylene homopolymer. After transfer to the twin-screw extruder, the powdery reaction mixture is melted in contact with the mixture of divinylbenzene and nitrogen, which is metered in, and with the addition of 0.1% by weight of tetrakis(methylene(3,5-di-t-butylhydroxyhydrocinnamate) methane and 0.1% by weight of tris(2,4di-t-butylphenyl) phosphite at a mass temperature of 225° C. and, after a coarse degassing, is subjected to a fine degassing while water is being added as entraining agent, discharged and granulated. The resulting, modified polypropylene contains 0.32% by weight of bound divinylbenzene, as determined by IR spectroscopy, and has a melt index of 3.10 g/10 min at 230° C./2.16 kg.

Preparation of a Chill Roll Film

In a tumbling mixture,

20% by weight of a modified polypropylene, containing 0.32% by weight of bound divinylbenzene and having a melt index of 3.10 g/10 min at 230° C./2.16 kg, 35% by weight of a largely amorphous polypropylene homopolymer, having a melt index of 7.2 g/10 min at 230° C./2.16 kg and an enthalpy of melting of 37 J/g and containing 83 percent of crystalline propylene, 45% by weight of coated chalk with an average particle diameter, measured over the longest extent of the particles, of 1 μm, as well as 0.1% by weight of tetrakis(methylene(3,5-di-t-butylhydroxyhydrocinnamate)methane and 0.1% by weight of tris-(2,4-di-t-butylphenyl) phosphite, in each case based on the sum of the polypropylenes, are mixed and supplied to the feeding funnel of laboratory chill roll equipment of the Erwepa company consisting of plasticizing extruders, sheet die, suction doctor blade, air knife, cooling roller I, polishing roller, cooling roller II and drawing-off unit, melted in the plasticizing extruder at a temperature profile of 180/220/235/240/235° C., extruded through a 650 mm wide sheet die at a temperature of 235° C. and pressed by means of the air knife onto the cooling roller I, which is kept at 20° C., and cooled, subsequently trimmed, drawn off and wound onto a central winder. The "neck-in" during the production of the film is 65 mm, that is, the realistic width of film is 585 mm. The thickness distribution of the chill-roll film is of the order of 40±0.35 μm.

In thermal bonding equipment, the chill-roll film is laminated onto a polypropylene nonwoven, having a weight per unit area of 30 g/m², using a melt adhesive based on a filled EVA copolymer and the composite as a whole is subjected to a subsequent biaxial stretching. The resulting composite, which has good breathing properties, has a water vapor permeability of 1540 g/cm²/24 h and a waterproofness in excess of 750 mm of water column.

What is claimed is:

1. Composites with a textile character with a water vapor permeability greater than 1,000 g/m²/24 h and a waterproofness in excess of 500 mm of water column, comprising A) textile fabrics, B) a film coating and/or an extrusion coating and optionally C) an intermediate layer of bonding agent between the textile fabric and the film coating and/or extrusion coating A) the textile fabrics representing woven, knitted or nonwoven fabrics based on polyethylene, polypropylenes, polyethylene terephthalate, polyamide, cellulose or cotton, B) the film coatings and/or extrusion coatings having a thickness of 3 to 200 μm and consisting of polypropylenes with the addition of 0.01 to 2.5% by weight of stabilizers, 0.01 to 1% by weight of processing aids, in each case based on the sum of the polypropylenes, and optionally 0.1 to 1% by weight of antistats, 0.2 to 3% by weight of pigments, 2 to 20% by weight of flame retardants and/or 0.05 to 1% by weight of nucleating agents, in each case based on the sum of the polypropylenes, as auxiliary materials, and/or 10 to 70% by weight, based on the sum of the polypropylenes, of inorganic and/or organic fillers and/ or reinforcing materials, and C) the intermediate layer of bonding agent between the textile fabric and the film coating and/or extrusion coating having a thickness of 0.5 to 20 μm and consisting of polar olefin copolymers and/or olefin grafted copolymers, such as EVA copolymers, ethylene/acrylic acid copolymers, ethylene/methyl acrylate copolymers or polyethylene or polypropylenes grafted with unsaturated carboxylic acids or carboxylic acid anhydrides, wherein the polypropylenes of the film coatings and/or extrusion coatings B) either are polypropylene mixtures, which consist on the one hand of B1) 1 to 50% by weight of modified propylene polymers with melt indexes of 0.1 to 50 g/10 min at 230° C./2.16 kg and a ratio of the intrinsic viscosity of the modified polypropylene to the intrinsic viscosity of the unmodified polypropylenes with largely the same weight average molecular weight of 0.20 to 0.95, and, on the other, of B2) 50 to 99% by weight of b2.1) propylene polymers prepared using Ziegler-Natta catalysts or metallocene catalysts, and/or copolymers of propylene, ethylene and/or α-olefins with 4 to 18 carbon atoms with a propylene content of 80.0 to 99.9% by weight in the form of random copolymers, block copolymers and/or random block copolymers with melt indexes of 0.1 to 300 g/10 min at 230° C./2.16 kg, and/or b2.2) a polyolefin mixture with an $M_w/M_n$ ratio of 2 to 6 and a melt index of 1 to 40 g/10 min at 230° C./2.16 kg, which consists of b2.2.1) 60 to 98% by weight of a crystalline copolymer of 85 to 99.5% by weight of propylene and 15 to 0.5% by weight of ethylene and/or an α-olefin of the general formula $CH_2=CHR$, R being a linear or branched alkyl group with 2 to 8 carbon atoms, and b2.2.2) 2 to 40% by weight of an elastic copolymer of 20 to 70% by weight of ethylene and 80 to 30% by weight of propylene and/or an α-olefin of the general formula $CH_2=CHR$, R being a linear or branched alkyl group with 2 to 8 carbon atoms, and/or b2.3) largely amorphous polypropylenes or propylene copolymers with a proportion of crystalline polypropylene or crystalline propylene copolymer of less than 10% by weight, an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole percent of propylene and at most 20 mole percent of one or more α-olefins of the general formula $CH_2=CHR$, wherein R is a linear or branched alkyl group with 2 to 8 carbon atoms, and/or b2.4) non-isotactic propylene homopolymers with a melt index of 1450 to 165° C., a melt viscosity in excess of 200,000 cps at 190° C., a heat of crystallization of 4 to 10 cal/g and a portion, soluble in diethyl ether, of 35% by weight to 55% by weight, or polypropylene mixtures, which consist only of B2), the components b2.2), b2.3) and b2.4) individually being contained in amounts of 5 to 100% by weight and the remaining components, individually or as a whole in the mixture, being contained in an amount up to 95% by weight.

2. The composites with a textile character of claim 1, wherein the modified propylene polymers B1) are modified propylene polymers, which have been produced by the treatment of propylene homopolymers and/or of copolymers of propylene and ethylene or α-olefins with 4 to 18 carbon atoms as well as of mixtures of said polypropylenes with multifunctional, ethylenically unsaturated monomers and/or with ionizing radiation or thermally decomposing free radical-forming agents.

3. The composites with a textile character of claims 1 or 2, wherein the modified propylene polymers B1) are modified propylene polymers, which were produced by the treatment of propylene homopolymers and/or copolymers of propylene and ethylene or α-olefins with 4 to 18 carbon atoms as well as of mixtures of said polypropylenes with multifunctional ethylenically unsaturated monomers and thermally decomposing free radical-forming agents by a continuous method, for which 1) propylene particles in the form of powders, granulates or grit with a preferred particle size ranging from 0.001 to 7 mm, which were prepared from 1.1) propylene homopolymers, especially from propylene homopolymers with a bimodal molecular weight distribution, weight average molecular weights $M_w$ of 500,000 to 1,500,000 g/mole, number average molecular weights $M_n$ of 25,000 to 100,000 g/mole and $M_w/M_n$ values of 5 to 60, which were produced in a reactor cascade using Ziegler-Natta catalysts or metallocene catalysts, and/or from 1.2) copolymers of propylene and ethylene or α-olefins with 4 to 18 carbon atoms, preferably of random propylene copolymers, propylene block copolymers, random propylene block copolymers and/or elastomeric polypropylenes, or of mixtures of said modified polypropylenes, are mixed in a continuous mixer with 0.05 to 3% by weight, based on the polypropylenes used, of acyl peroxides, alkyl peroxides, hydroperoxides, peroxycarbonates and/or peresters as thermally decomposing free radical-forming agents, the thermal decomposition of which preferably is concluded at a temperature below 210° C. and which optionally are diluted with inert solvents, while being heated to 30° to 100° C., 2) readily volatile bifunctional monomers diene and/or $C_7$ to $C_{10}$ which are adsorbed by the polypropylene particles from the gas phase as continuous gas-solid adsorbers, at a temperature T of 20° C. to 120° C., and an average absorption time $t_s$ of 10 seconds to 1,000 seconds, the proportion of bifunctional, unsaturated monomers in the polypropylene particles being 0.01 to 10% by weight, based on the polypropylenes used, subsequently 3) the polypropylene particles, in which the acyl peroxides, alkyl peroxides, hydroperoxides, peroxycarbonates and/or peresters, as thermally decomposing free radical-forming agents, and the bifunctional, unsaturated monomers are absorbed, under an atmosphere of inert gas and these readily volatile, bifunctional monomers are melted at 110° C. to 210° C. in continuously operating kneaders or extruders and, at the same time, the thermally decomposing free radical-forming agents are decomposed, 4) the melt then is heated to 220° C. to 300° C., unreacted monomers and decomposition products being removed, and 5) the melt is granulated by known procedures, and for which, before step 1) and/or 5) of the method and/or before or during step 3) and/or 4) of the method, 0.01 to 2.5% by weight of stabilizers, 0.1 to 1% by weight of antistats, 0.2 to 3% by weight of pigments, 0.05 to 1% by weight of nucleating agents and/or 0.01 to 5% by weight of processing aids, based on the polypropylene used, are added as further auxiliary materials.

4. The composites with a textile character of claim 1, wherein the modified propylene polymers B1) consist of modified propylene polymers, which were produced by reacting functionalized polypropylenes, preferably polypropylenes containing acid and/or anhydride groups, with multifunctional compounds of opposite reactivity, preferably with $C_2$ to $C_{16}$ diamines and/or $C_2$ to $C_{16}$ diols.

5. The composites with a textile character of claim 1, wherein the modified propylene polymers B1) consist of propylene polymers, which were produced by the hydrolytic condensation of polypropylenes containing hydrolyzable silane groups.

6. The composites with a textile character of one of the preceding claims 1, 2, 4 or 5, wherein the textile fabrics A) represent propylene nonwovens with a weight per unit area of 5 to 70 g/m², which were produced preferably by the spin bonding technology.

7. The composites with a textile character of one of claims 1, 2, 4 or 5, wherein the inorganic fillers and/or reinforcing materials in component B) are calcium carbonates or chalks with a particle diameter, measured over the longest extent of the particles, of 0.05 to 20 μm.

8. The composites with a textile character of one claims 1, 2, 4 or 5, wherein the film coatings and/or extrusion coatings B) consist of 5 to 25% by weight of modified propylene polymers, 25 to 60% by weight of component B2.2) and 20 to 60% by weight of chalk.

9. A method for the production of composites with a textile character with a water vapor permeability greater than 1,000 g/m²/24 h and a waterproofness of more than 500 mm of water column by 1) applying a film coating with a layer thickness of 3 to 200 μm of composition B) by the chill roll coating method at mass temperatures of 190° to 290° C., optionally with the application of an intermediate layer C) of bonding agent on textile fabrics A), or 2) applying an extrusion coating with a layer thickness of 3 to 200 μm of composition B) by the extrusion coating method at mass temperatures of 200° to 290° C., optionally with the application of an intermediate layer C) of bonding agents on textile fabrics A), or 3) thermally bonding a polypropylene film having a thickness of 10 to 200 μm of composition B) with a textile fabric A), optionally with application of an intermediate layer C) of bonding agents on textile fabric A), A) the textile fabrics being woven, and knitted or nonwoven fabrics based on polyethylene, polypropylene, polyethylene terephthalate, polyamide, cotton or cellulose, B) the film coatings and/or extrusion coatings being of polypropylenes with addition of 0.01 to 2.5% by weight of stabilizers, 0.01 to 1% by weight of processing aids, in each case based on the sum of the polypropylenes, and optionally 0.1 to 1% by weight of antistats, 0.2 to 3% by weight of pigments, 2 to 20% by weight of flame retardants and/or 0.05 to 1% by weight of nucleating agents, in each case based on the sum of the polypropylenes, as auxiliary materials, and/or 10 to 70% by weight, based on the sum of the polypropylenes, of inorganic and/or organic fillers and/or reinforcing materials, and C) the intermediate layer of bonding agent between textile fabric and film coating and/or extrusion coating having a layer thickness of 0.5 to 20 μm and consisting of: polar olefin copolymers and/or olefin grafted copolymers, such as EVA copolymers, ethylene acrylic acid copolymers, ethylene methyl acrylate copolymers or polyethylene or polypropylene grafted with unsaturated carboxylic acids or carboxylic acid anhydrides, wherein, the polypropylenes of the film coatings and/or extrusion coatings B) either are polypropylene mixtures, which consist, on the one hand, of B1) 1 to 50% by weight of modified propylene polymers with melt indexes of 0.1 to 50 g/10 min at 230° C./2.16 kg and a ratio of the intrinsic viscosity of the modified polypropylene to the intrinsic viscosity of the unmodified polypropylene with largely the same weight average molecular weight of 0.20 to 0.95 and, on the other, of B2) 50 to 99% by weight of b2.1) propylene polymers, preferably propylene homopolymers, prepared using Ziegler-Natta catalysts or metallocene catalysts, and/or copolymers of propylene, ethylene and/or α-olefins with 4 to 18 carbon atoms with a propylene content of 80.0 to 99.9% by weight in the form of random copolymers, block copolymers and/or random block copolymers with melt indexes of 0.1 to 300 g/10 min at 230° C./2.16 kg, and/or b2.2) a polyolefin mixture with an $M_w/M_n$ ratio of 2 to 6 and a melt index of 1 to 40 g/10 min at 230° C./2.16 kg, which consists of b2.2.1) 60 to 98% by weight of a crystalline copolymer of 85 to 99.5% by weight of propylene and 15 to 0.5% by weight of ethylene and/or an α-olefin of the general formula $CH_2=CHR$, R being a linear or branched alkyl group with 2 to 8 carbon atoms, and b2.2.2) 2 to 40% by weight of an elastic copolymer of 20 to 70% by weight of ethylene and 80 to 30% by weight of polypropylene and/or an α-olefin of the general formula $CH_2=CHR$, R being a linear or branched alkyl group with 2 to 8 carbon atoms, and/or b2.3) largely amorphous polypropylenes or propylene copolymers with a proportion of crystalline polypropylenes or crystalline propylene copolymer of less than 10% by weight, an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole percent of propylene and at most 20 mole percent of one or more α-olefins of the general formula $CH_2=CHR$, wherein R is a linear or branched alkyl group with 2 to 8 carbon atoms, and/or b2.4) non-isotactic propylene homopolymer with a melting point of 145° to 165° C., a melt viscosity in excess of 200,000 cps at 190° C., a heat of crystallization of 4 to 10 cal/g and a 35% by weight to 55% by weight portion, soluble in diethyl ether, or polypropylene mixtures, which consist only of B2), the components b2.2), b2.3) and b2.4) individually being contained in amounts of 5 to 100% by weight and the remaining components, individually or as a whole in the mixture, being contained in an amount up to 95% by weight, and that the composites with a textile character can be subjected to a monoaxial or biaxial afterstretching.

* * * * *